UNITED STATES PATENT OFFICE.

RAYMOND S. HEUSER, OF EVANSTON, ILLINOIS.

ART OF MANUFACTURING CEREAL BEVERAGES.

1,390,711.  Specification of Letters Patent.  Patented Sept. 13, 1921.

No Drawing.  Application filed August 2, 1920.  Serial No. 400,574.

*To all whom it may concern:*

Be it known that I, RAYMOND S. HEUSER, a citizen of the United States, residing at 929 Sheridan road, Evanston, in the county of Cook and State of Illinois, have invented a new and useful Improvements in the Art of Manufacturing Cereal Beverages, of which the following is a specification.

The present invention relates to the manufacture of fermented beverages, such as fermented cereal beverages, and will be fully understood from the following description thereof.

In accordance with the present invention a fermented beverage, for example, a fermented cereal beverage is prepared either with its full alcohol contents, or in such manner as to have an alcohol content less than one half of one per cent. In the case of a beverage containing its full or normal alcoholic content, the usual brewing methods for the manufacture of a beer, ale, stout, porter or other like cereal beverages prepared from malt or from mixtures of malt and other grains may be employed. Where a reduced alcohol content of the beverage is desired, it is preferred that a fully fermented beer or other cereal beverage be first produced, then dealcoholized, and finally a limited yeast fermentation produced therein as described in prior Patent No. 1,302,551, May 6, 1919, and its reissue No. 14,889, the secondary fermentation being so conducted as to produce not more than one half of one per cent. of alcohol or such amount as may be desired in the final beverage.

After the fermentation of the beverage is completed, it may be permitted to stand to deposit sediment, yeast cells and the like, and may, if desired, be further clarified by filtration. After the clarification of the beverage has been effected, I add thereto a relatively small proportion of glycerin, for example, fifty grams of glycerin per barrel of the beverage. The beverage is then stirred in order that the glycerin added may be thoroughly admixed therewith. I may likewise add glycerin in the manner described to concentrated cereal beverage extracts and the like.

As a result of the addition of the glycerin, I have discovered that the physical characteristics of the beverage, and more particularly its clearness or brilliancy are greatly improved. The addition of the glycerin likewise renders the beverage more stable and reduces or prevents the formation of sediment on agitation of the beverage and on filling. The addition of the glycerin likewise improves the palatability and body of the beverage.

After the addition of the glycerin the beverage may be again filtered to perfect brilliancy, if desired, carbonated, bottled and pasteurized or otherwise packaged in accordance with the usual practice.

If desired, the glycerin may be added to the beverage before clarification. It is found that in such case, however, the use of larger amounts of glycerin is necessary. The glycerin used should be pure, that is, it should be free from fatty acids, the addition of which to a beverage of the character described reduces or completely prevents foam production. It is my belief that the action of the glycerin in increasing the brilliancy of the beverage and also its stability is largely due to the capacity of the glycerin of bringing into solution the resinous materials of the beverage and likewise the complex tannates resulting from the action of the tannic acids of the hops upon the nitrogenous compounds in the beverage. I do not intend, however, that the theory which I have expressed as to the action of the glycerin, nor that the specific details of the example of my invention which I have given shall be regarded as limitations upon the scope of the invention.

I claim:

1. The process of improving the physical and beverage characteristics of fermented beverages which consists in adding glycerin thereto.

2. The process of improving the physical and beverage characteristics of fermented cereal beverages which consists in clarifying the beverage and subsequently adding glycerin thereto.

3. The process of producing low alcoholic fermented cereal beverages which consists in boiling an alcoholic beer, to eliminate the alcohol therefrom, producing a secondary fermentation therein with the production of less than one-half per cent of alcohol, filtering and adding glycerin thereto in the proportion of fifty grams per barrel.

RAYMOND S. HEUSER.